(12) United States Patent
Desmottes

(10) Patent No.: US 10,434,446 B2
(45) Date of Patent: Oct. 8, 2019

(54) SYNTHETIC COMPRESSIBLE MEDIUM FILTER BACKWASH PROCESSES

(71) Applicant: SUEZ TREATMENT SOLUTIONS INC., Paris (FR)

(72) Inventor: Christophe D Desmottes, West Point, VA (US)

(73) Assignee: Suez Treatment Solutions Inc. (FR)

( * ) Notice: Subject to any disclaimer, the term of this patent is extended or adjusted under 35 U.S.C. 154(b) by 0 days.

(21) Appl. No.: 15/343,374

(22) Filed: Nov. 4, 2016

(65) Prior Publication Data

US 2017/0120170 A1    May 4, 2017

Related U.S. Application Data

(60) Provisional application No. 62/250,771, filed on Nov. 4, 2015.

(51) Int. Cl.
| | |
|---|---|
| *B01D 29/66* | (2006.01) |
| *C02F 1/00* | (2006.01) |
| *B01D 39/16* | (2006.01) |
| *B01D 24/46* | (2006.01) |
| *B01D 24/00* | (2006.01) |
| *B01D 24/04* | (2006.01) |
| *B01D 24/12* | (2006.01) |

(52) U.S. Cl.
CPC ....... *B01D 39/1623* (2013.01); *B01D 24/002* (2013.01); *B01D 24/04* (2013.01); *B01D 24/042* (2013.01); *B01D 24/12* (2013.01); *B01D 24/4631* (2013.01); *B01D 24/4668* (2013.01); *C02F 1/004* (2013.01); *C02F 2303/16* (2013.01)

(58) Field of Classification Search
CPC . B01D 24/4631; B01D 39/1623; C02F 1/004; C02F 2303/16
See application file for complete search history.

(56) References Cited

U.S. PATENT DOCUMENTS

| | | |
|---|---|---|
| 2003/0024560 A1 | 3/2003 | Hoffmeier |
| 2003/0111431 A1* | 6/2003 | Dew, Jr. ............... B01D 24/002 210/807 |

(Continued)

OTHER PUBLICATIONS

International Search Report completed Jul. 20, 2017; 4 pages.

*Primary Examiner* — Dirk R Bass
(74) *Attorney, Agent, or Firm* — Landmark Intellectual Property Law, PLLC

(57) ABSTRACT

The invention is directed to methods of providing backwash processes for a synthetic compressible medium filter system. More specifically, the system may include a backwash pump and air blower, and the processes may include at least three sequences of: air and water wash; air purge; and medium compression. The backwash process may be triggered by one or more of a pressure, time point, and/or turbidity set point. The air and water wash sequence may include breaking and washing the medium. The air purge sequence may include removing substantially all of the air entrapped in the medium by providing a backwash water flow for a period of time; and a medium compression sequence compressing the medium while avoiding exposing the medium to air, including introducing raw water and where the backwash and raw water provide enough energy to compress the medium without introduction of air into the medium.

27 Claims, 3 Drawing Sheets

(56) References Cited

U.S. PATENT DOCUMENTS

2004/0067136 A1  4/2004 Roberts
2004/0226897 A1* 11/2004 Boner ................ B01D 24/005
                                                210/793

* cited by examiner

SYNTHETIC COMPRESSIBLE MEDIUM FILTER BACKWASH PROCESSES

RELATED APPLICATIONS

The present invention claims priority to U.S. Provisional Patent Application No. 62/250,771, filed 4 Nov. 2015, entitled "Waste Water Gravity Filter" which is incorporated herein in its entirety.

BACKGROUND

The present invention is generally directed to a filter for treatment of an influent. More specifically, the present invention is directed to a synthetic compressible media filter, which may be compressed due to the fluid flow there through.

Wastewater treatment may often comprise multiple stages, often referred to as primary, secondary, and tertiary treatment. While primary treatment may include sedimentation and secondary treatment may reduce dissolved and suspended organic compounds in the wastewater, tertiary treatment may improve effluent quality by removing remaining inorganic components before being discharged back to the environment. Tertiary treatment has included various approaches, including sand filtration, further sedimentation tanks, removal of elements (such as excess nitrogen or phosphorus).

Environmental preservation has inspired governmental administrations to reinforce stringent discharge limit applications on total suspended solids (TSS) and turbidity for effluent nutriment residual from municipal wastewater treatment plants (WWTP) tertiary treatment. TSS and turbidity discharge limitations combined with capital expenditure (CAPEX) and operational expenditure (OPEX) improvements, are the two main drivers for optimization of wastewater tertiary physical treatment. Conventional tertiary filters are organized by four medium characteristics which are cloth, granular, non-granular and membrane. Cloth and single/dual granular medium have filtration rate limits between 3 gpm/ft$^2$ or 7.3 m$^3$/h/m$^2$ and 6 gpm/ft$^2$ or 14.7 m$^3$/h/m$^2$, while membrane filtration ability is constrained by organic loading fouling effects on membrane.

Compressible medium filters have been used to provide varying degrees of wastewater filtration. Compressible medium filters, in general, involve the use of a synthetic compressible porous fiber material (for example, polyvaniladene), rather than a granular media (for example, sand). In accordance with some existing compressible medium filters, the properties of the medium—such as porosity—may be modified by compressing (or releasing) the medium. Such compressible medium filters may be able to achieve increased filtration loading rates. For example, some compressible medium filters have been tested with filtration loading rates up to six times higher (30 gpm/ft$^2$ or 73.3 m$^3$/h/m$^2$) than cloth and granular filters without any additional backwash requirements.

However, in order to provide the ability to compress the medium, the filter medium is generally disposed between two plates, at least one of which may be controllably movable to compress the medium. The mechanical devices necessary to compress the medium may add significant complication to a filtration device, and accordingly cause an increase in the capital expense of building such a filtration device.

Accordingly, it is desirable to provide a filtration device that is as effective or more effective than typical compressible medium filters, without the added complication and cost of compression machinery.

SUMMARY OF THE INVENTION

Some aspects in accordance with some embodiments of the present invention may include a method of providing backwash to a synthetic compressible medium filter system comprising a filter including compressible filter medium, at least one backwash pump, and at least one air scour blower, the method comprising at least three sequences of: air and water wash; air purge; and medium compression.

Some aspects may further include a method of providing backwash to a synthetic compressible medium filter system comprising a filter including compressible filter medium, at least one backwash pump, and at least one air scour blower, the method comprising at least three sequences of: air and water wash; air purge; and medium compression, wherein the backwash may be triggered by one or more of a pressure set point, time set point (2 hours to 24 hours), and/or turbidity set point.

Some aspects may further include a method of providing backwash to a synthetic compressible medium filter system comprising a filter including compressible filter medium, at least one backwash pump, and at least one air scour blower, the method comprising at least three sequences of: air and water wash; air purge; and medium compression, wherein the backwash may be triggered by one or more of a pressure set point, time set point (2 hours to 24 hours), and/or turbidity set point, wherein the pressure set point may be adjustable based upon factors including filter geometry, medium thickness, solid loading, and/or hydraulic loading, and comprises a set point between 36 to 200 inches of H$_2$O.

Some aspects may further include a method of providing backwash to a synthetic compressible medium filter system comprising a filter including compressible filter medium, at least one backwash pump, and at least one air scour blower, the method comprising at least three sequences of: air and water wash; air purge; and medium compression, wherein the backwash may be triggered by one or more of a pressure set point, time set point (2 hours to 24 hours), and/or turbidity set point, wherein the time set point may be between two (2) to twenty-four (24) hours.

Some aspects may further include a method of providing backwash to a synthetic compressible medium filter system comprising a filter including compressible filter medium, at least one backwash pump, and at least one air scour blower, the method comprising at least three sequences of: air and water wash; air purge; and medium compression, wherein the backwash may be triggered by one or more of a pressure set point, time set point (2 hours to 24 hours), and/or turbidity set point, wherein the turbidity set point may be less than six (6) or between five (5) and fifteen (15) Nephelometric Turbidity Units (NTU).

Some aspects may further include a method of providing backwash to a synthetic compressible medium filter system comprising a filter including compressible filter medium, at least one backwash pump, and at least one air scour blower, the method comprising at least three sequences of: air and water wash; air purge; and medium compression, wherein the air and water wash sequence may comprise breaking the medium and washing the medium.

Some aspects may further include a method of providing backwash to a synthetic compressible medium filter system comprising a filter including compressible filter medium, at least one backwash pump, and at least one air scour blower, the method comprising at least three sequences of: air and water wash; air purge; and medium compression, wherein the air and water wash sequence may comprise breaking the medium and washing the medium, wherein breaking the medium comprises using water and air flow to generate forces to break the medium free from a compressed stage and washing the medium comprises combining water received in the filter medium from the backwash pump and air from the air scour blower to create motion patterns to cause collision of the filter media.

Some aspects may further include a method of providing backwash to a synthetic compressible medium filter system comprising a filter including compressible filter medium, at least one backwash pump, and at least one air scour blower, the method comprising at least three sequences of: air and water wash; air purge; and medium compression, wherein the air and water wash sequence may comprise breaking the medium and washing the medium, wherein breaking the medium comprises using water and air flow to generate forces to break the medium free from a compressed stage and washing the medium comprises combining water received in the filter medium from the backwash pump and air from the air scour blower to create motion patterns to cause collision of the filter media, and wherein breaking the medium may use a water flow of 10 gpm/ft$^2$ and air flow of 15 scfm for a period of time, such as for between one (1) to five (5) minutes.

Some aspects may further include a method of providing backwash to a synthetic compressible medium filter system comprising a filter including compressible filter medium, at least one backwash pump, and at least one air scour blower, the method comprising at least three sequences of: air and water wash; air purge; and medium compression, wherein the air and water wash sequence may comprise breaking the medium and washing the medium, wherein breaking the medium comprises using water and air flow to generate forces to break the medium free from a compressed stage and washing the medium comprises using the backwash pump to provide a backwash flow into the medium and the air scour blower to provide air into the medium at flow rates of approximately 10 gpm/ft$^2$ and the air scour blower provides air flow of approximately 10 scfm/ft$^2$, causing bubbles which carry at least some of the media to the top of the filter, at which point the air escapes from the filter and the media sinks downward, striking media ascending with air bubbles.

Some aspects in accordance with some embodiments of the present invention may include a method of providing backwash to a synthetic compressible medium filter system comprising a filter including compressible filter medium, at least one backwash pump, and at least one air scour blower, the method comprising at least three sequences of: air and water wash; air purge; and medium compression, wherein the air purge sequence comprises removing substantially all of the air entrapped in the medium by providing an upward water flow from the backwash pump to the medium for a period of time (such as between one (1) and ten (10) minutes) at a rate of 5 to 10 gpm/ft$^2$.

Some aspects in accordance with some embodiments of the present invention may include a method of providing backwash to a synthetic compressible medium filter system comprising a filter including compressible filter medium, at least one backwash pump, and at least one air scour blower, wherein medium compression comprises a transition between backwash and filtration processes of the filter system, during which excess backwash water is drained from the filter and influent flow is provided above the usual rate in order to compress the media quickly and eliminate the need for a water to waste sequence.

Some aspects in accordance with some embodiments of the present invention may include a method of providing backwash to a synthetic compressible medium filter system comprising a filter including compressible filter medium, at least one backwash pump, and at least one air scour blower, wherein medium compression comprises a transition between backwash and filtration processes of the filter system, during which excess backwash water is drained from the filter and influent flow is provided above the usual rate in order to compress the media quickly and eliminate the need for a water to waste sequence, further comprising introducing raw water into the filter, and wherein the backwash water and introduced raw water provide enough energy to compress the medium without introduction of air into the medium.

Some aspects in accordance with some embodiments of the present invention may include a method of providing backwash to a synthetic compressible medium filter system comprising a filter including compressible filter medium, at least one backwash pump, and at least one air scour blower, the method comprising at least three sequences of: air and water wash; air purge; and medium compression, wherein medium compression comprises a transition between backwash and filtration processes of the filter system, during which a water to waste sequence is used to minimize turbidity release of the filter effluent.

Some aspects in accordance with some embodiments of the present invention may include a method of providing backwash to a synthetic compressible medium filter system comprising a filter including compressible filter medium, at least one backwash pump, and at least one air scour blower, the method comprising at least three sequences of: air and water wash; air purge; and medium compression, wherein medium compression comprises a transition between backwash and filtration processes of the filter system, during which a water to waste sequence comprising sending backwash water directly to waste after flowing through the filter is used to minimize turbidity release of the filter effluent.

In accordance with some embodiments of the present invention, aspects may also include: a method of providing backwash to a synthetic compressible medium filter system comprising a filter including compressible filter medium, at least one backwash pump, and at least one air scour blower, the backwash being triggered by one or more of a pressure set point, time set point, and/or turbidity set point, the backwash method comprising at least three sequences of: an air and water wash sequence, comprising breaking the medium and washing the medium; an air purge sequence, comprising removing substantially all of the air entrapped in the medium by providing a flow of water from the backwash pump to the medium for a period of time; and a medium compression sequence, compressing the medium to achieve desired filtration rates, while avoiding exposing the medium to air, the medium compression sequence comprising introducing raw water into the filter, where the backwash water and introduced raw water provide enough energy to compress the medium without introduction of air into the medium.

Aspects may also include: a method of providing backwash to a synthetic compressible medium filter system comprising a filter including compressible filter medium, at least one backwash pump, and at least one air scour blower, the backwash being triggered by one or more of a pressure set point, time set point, and/or turbidity set point, the backwash method comprising at least three sequences of: an air and water wash sequence, comprising breaking the medium and washing the medium; an air purge sequence, comprising removing substantially all of the air entrapped in the medium by providing a flow of water from the backwash pump to the medium for a period of time; and a medium compression sequence, compressing the medium to achieve desired filtration rates, while avoiding exposing the medium to air, the medium compression sequence comprising introducing raw water into the filter, where the backwash water and introduced raw water provide enough energy to compress the medium without introduction of air into the medium, wherein breaking the medium comprises using water received from the backwash pump and air flow from the air scour blower to generate forces to break the medium free from a compressed stage; and washing the medium comprises combining water received in the filter medium from the backwash pump and air from the air scour blower to create motion patterns to cause collision of the filter media, wherein the air scour blower provides air into the medium, causing bubbles which carry at least some of the media to the top of the filter, at which point the air escapes from the filter and the media sinks downward, striking media ascending with air bubbles.

Aspects may also include: a method of providing backwash to a synthetic compressible medium filter system comprising a filter including compressible filter medium, at least one backwash pump, and at least one air scour blower, the backwash being triggered by one or more of a pressure set point, time set point, and/or turbidity set point, the backwash method comprising at least three sequences of: an air and water wash sequence, comprising breaking the medium and washing the medium; an air purge sequence, comprising removing substantially all of the air entrapped in the medium by providing a flow of water from the backwash pump to the medium for a period of time; and a medium compression sequence, compressing the medium to achieve desired filtration rates, while avoiding exposing the medium to air, the medium compression sequence comprising introducing raw water into the filter, where the backwash water and introduced raw water provide enough energy to compress the medium without introduction of air into the medium, wherein medium compression comprises a transition between backwash and filtration processes of the filter system, during which excess backwash water is drained from the filter and influent flow is provided above the usual rate in order to compress the media quickly and eliminate the need for a water to waste sequence.

aspects may also include: a method of providing backwash to a synthetic compressible medium filter system comprising a filter including compressible filter medium, at least one backwash pump, and at least one air scour blower, the backwash being triggered by one or more of a pressure set point, time set point, and/or turbidity set point, the backwash method comprising at least three sequences of: an air and water wash sequence, comprising breaking the medium and washing the medium; an air purge sequence, comprising removing substantially all of the air entrapped in the medium by providing a flow of water from the backwash pump to the medium for a period of time; and a medium compression sequence, compressing the medium to achieve desired filtration rates, while avoiding exposing the medium to air, the medium compression sequence comprising introducing raw water into the filter, where the backwash water and introduced raw water provide enough energy to compress the medium without introduction of air into the medium, wherein medium compression comprises a transition between backwash and filtration processes of the filter system, during which a water to waste sequence is used to minimize turbidity release of the filter effluent.

Some aspects of the present invention in accordance with some embodiments may include a method of providing backwash to a synthetic compressible medium filter system comprising a filter including compressible filter medium, at least one backwash pump, and at least one air scour blower, the backwash being triggered by one or more of a pressure set point, time set point, and/or turbidity set point, the backwash method comprising at least three sequences of: an air and water wash sequence, comprising breaking the medium and washing the medium, wherein: breaking the medium comprises using water received from the backwash pump and air flow from the air scour blower to generate forces to break the medium free from a compressed stage; and washing the medium comprises combining water received in the filter medium from the backwash pump and air from the air scour blower to create motion patterns to cause collision of the filter media, wherein the air scour blower provides air into the medium, causing bubbles which carry at least some of the media to the top of the filter, at which point the air escapes from the filter and the media sinks downward, striking media ascending with air bubbles; an air purge sequence, comprising removing substantially all of the air entrapped in the medium by providing a flow of water from the backwash pump to the medium for a period of time; and a medium compression sequence which provides a transition between backwash and filtration processes of the filter system, during which the medium is compressed to achieve desired filtration rates, while avoiding exposing the medium to air, the medium compression sequence comprising introducing raw water into the filter, where the backwash water and introduced raw water provide enough energy to compress the medium without introduction of air into the medium.

These and other aspects will become apparent from the following description of the invention taken in conjunction with the following drawings, although variations and modifications may be effected without departing from the scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Figure 1:
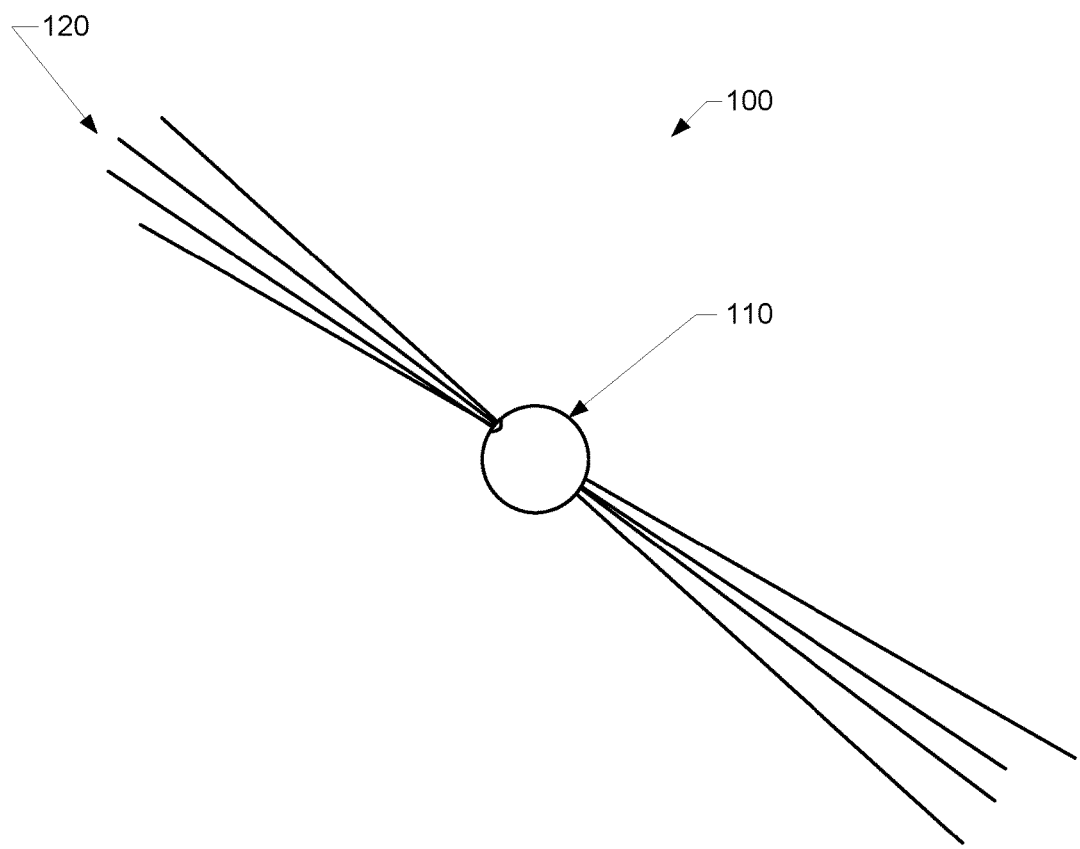
FIG. 1 illustrates an exemplary media that may be used in a compressible media filter, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

In general, the present invention is directed to a synthetic compressible medium filter that does not require the use of additional mechanical devices to compress the medium. Instead, in accordance with aspects of some embodiments of the present invention, the medium is compressed by the fluid flow, thereby obviating the need for additional machinery, and providing for more efficient backwashing operations (thereby reducing increased operating expenses).

In general, aspects in accordance with some embodiments of the present invention may comprise a synthetic compressible medium filter (SCMF) capable of hydraulic rate of approximately 40 gpm/ft$^2$. Moreover, the SCMF may produce effluent with a total suspended solids (TSS) of less than approximately 5 mg/L, with a turbidity of less than 2 NTU. More specifically, the SCMF may operate to provide an effluent with a TSS range of 1 mg/L to 4 mg/L, with a turbidity between 1-1.9 NTU. In addition, SCMF in accordance with some embodiments of the present invention may utilize less than 7% (in accordance with some embodiments, utilize only 3%) of volume of water treated for backwash.
Initial Testing In general, initial testing comprised the use of a 12" or 30.5 cm diameter column. The specific media design and selection was based at least in part on solid removal and medium aptitude to compress when subjected to 13 gpm/ft$^2$ or 31.8 m$^3$/h/m$^2$ filtration rate.

The selected media tested with a solid removal and backwash performances at 24 gpm/ft$^2$ or 58.7 m$^3$/h/m$^2$ filtration rate. For tracking purposes, such performance was compared to the performance of filters using a well-known media—sand anthracite dual medium (DM), tested at 5 gpm/ft$^2$ or 12.2 m$^3$/h/m$^2$ filtration rate using two 12 inches or 30.5 cm diameter columns mounted in parallels. Comparison results yielded parameters to design and build a 9 ft$^2$ or 0.84 m$^2$ cross section commercial pilot unit.

In general, the filter media may be comprised of synthetic fibers held together by a bead. For example, with reference to FIG. 1, filter media 100 may comprise fibers 110 may be fed through a bead 120, such that the bead retains together.

While the fibers may comprise any suitable filtration material, testing has shown that polyethylene terephthalate, with a fiber density of approximately 1.38 g/cm$^3$ works well. The bead may comprise any suitable material, though in testing a bead comprising atactic polystyrene was utilized. However, the specific type of material, density, size, etc. does not impact the claimed invention; indeed, any material and/or size may be utilized without deviating from the present invention.

Figure 2:
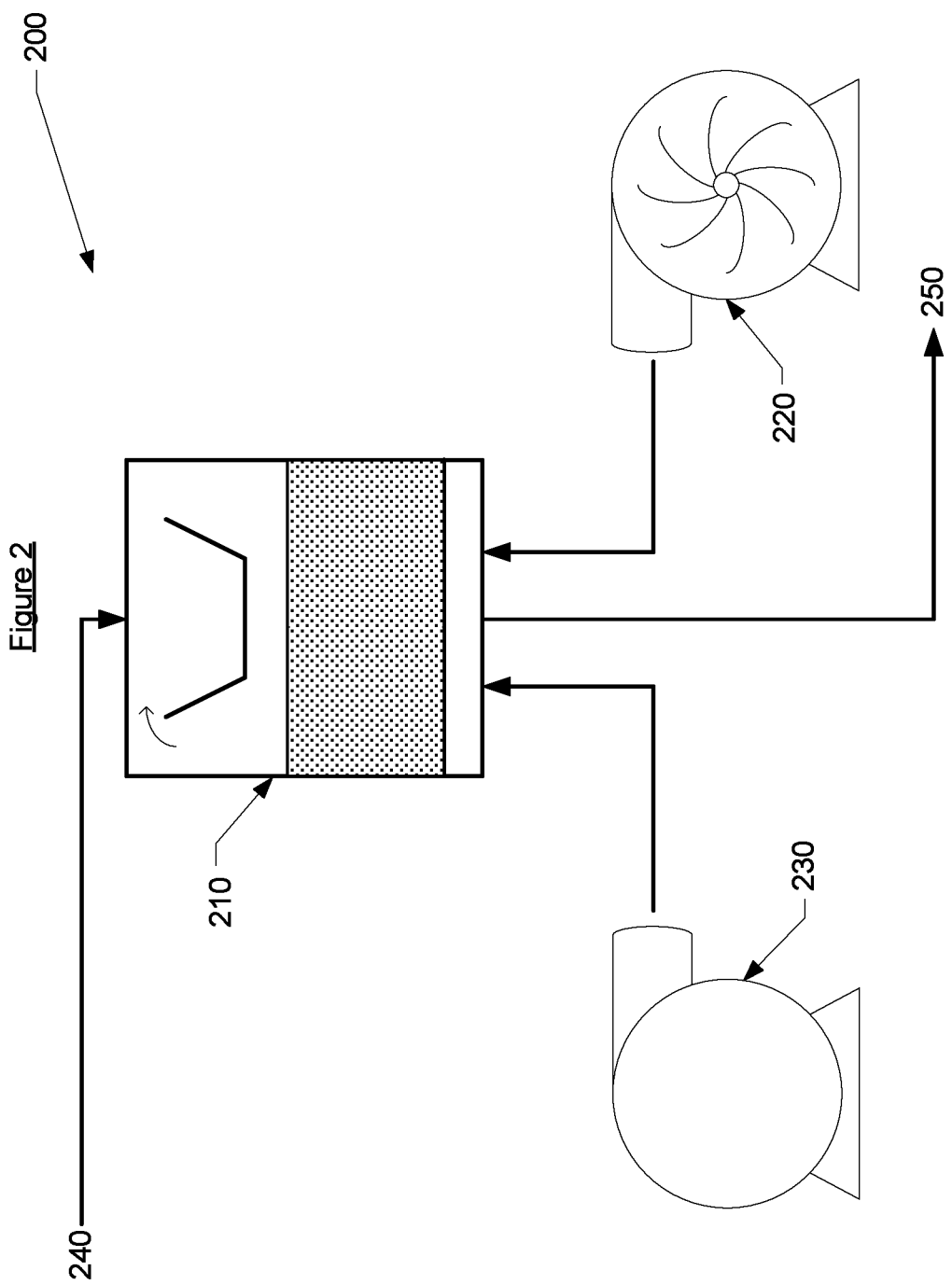
FIG. 2 illustrates an exemplary compressible media filtration system, in accordance with some embodiments of the present invention.

With reference to FIG. 2, system 200 may comprise one or more synthetic compressible medium filters 210, one or more air scour blowers 220, and one or more backwash pumps 230. In general, influent may be received by conduit 240 into the synthetic compressible medium filter, and a treated effluent may exit the system via conduit 250.

Figure 3:
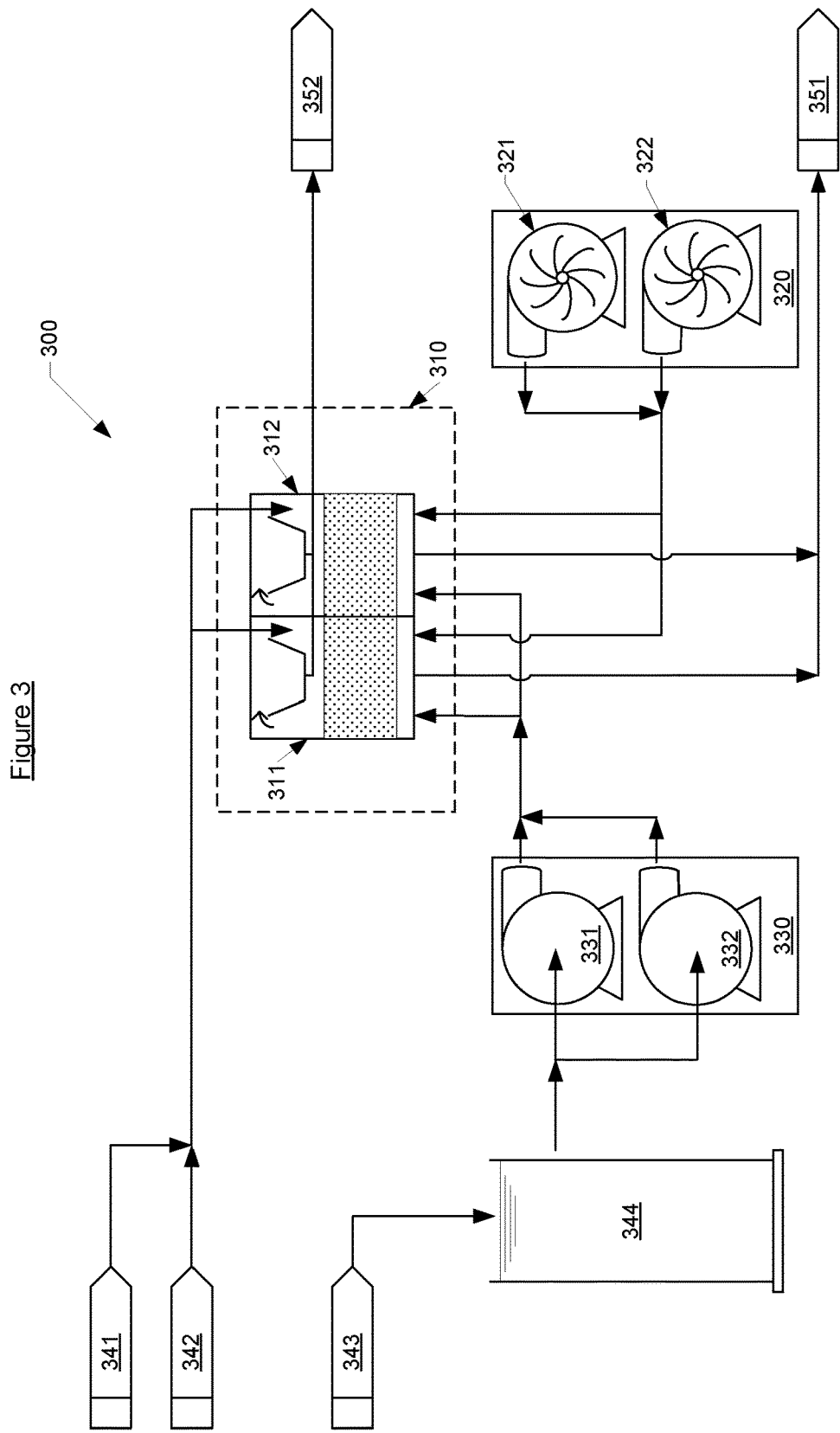
FIG. 3 illustrates an exemplary compressible media filtration system, in accordance with some embodiments of the present invention.

With reference to FIG. 3, a system 300 may comprise similar components as in FIG. 2. System 300 may comprise a synthetic compressible medium filter 310, which in turn may comprise two (2) synthetic compressible medium filters 311, 312 plumbed in parallel. In general, one of the filters 311 would be the duty filter, while the second 312 would be an inline spare. Similarly, air scour blower 320 may comprise two (2) blower units 321, 322, and backwash pump 330 may comprise two (2) backwash pumps 331, 332, each comprising one duty apparatus and one inline spare.

Inputs to system 300 may comprise influent 341, which may for example comprise blowdown water from cooling towers. Additional influent 342 may be received from filter and polymer feed system as well, in order to additionally treat the wastewater. Influent 341 and 342 may be combined and provided directly to the synthetic compressible medium filter 311, 312.

Additional water 343 may be input from service water/fire water tanks and utilized to provide an input to filter backwash tank 344. Water in the filter backwash tank 344 may be drawn by the backwash pumps 331, 332 to backwash the filters 311, 312.

Effluent 351 may flow from the synthetic compressible medium filters 311, 312 and may leave the system. Backwash waste 352 may also exit the system 300.

While any suitable backwash pumps and air scour blowers may be used, testing was completed utilizing two (2) horizontal centrifugal filter backwash pumps, with a capacity of 1850 gpm at 30 psi. The backwash air scour blowers may be positive displacement with noise reduction enclosures, with a capacity of 225 SCFM at 7 psi.
Pilot Testing A pilot test system was designed and built that was capable of filtration rates up to 40 gpm/ft$^2$ or 97.8 m$^3$/h/m$^2$. A series of tests were conducted to evaluate the new SCMF technology at 30 gpm/ft$^2$ or 73.3 m$^3$/h/m$^2$ with/without coagulant and polymer addition, at 35 gpm/ft$^2$ or 85.6 m$^3$/h/m$^2$ and 40 gpm/ft$^2$ or 97.8 m$^3$/h/m$^2$ without chemical addition.

As noted above, the present invention utilizes a synthetic compressible medium filter that does not require additional compression mechanisms, but relies upon the fluid flow to provide desirable compression. During pilot testing, a pilot unit with a 9 square foot cross section was equipped with uncompressed medium at a thickness of approximately 30 inches. During use, the medium compressed to approximately 12 inches. In practice, a filter bed depth may be a function of the solid load, which in turn may be a function of the raw water TSS concentration and filtration flow rate. The higher the TSS concentration and the higher the filtration flow rate required, the deeper the media bed in order to perform. As a non-limiting example, bed depths may easily range from 24-48 inches. Such pilot unit received an influent with a maximum TSS of 10.0 mg/L and a maximum turbidity of 5.0 NTU.

The filter may comprise a down flow unit with a 12 inch or 0.3 m medium thickness after compression made of polypropylene fiber, constituted by a plenum which may collect treated water during filtration and hold air and water during backwash and a filtration/backwash zone. Nozzles (such as, for example, those sold under the Monofloor® trademark) may be used to produce a distributed flow between the plenum and filtration/backwash zone. A media retaining screen may be adequately position above the medium to allocate sufficient media space during backwash. The screen may also maintains hydraulic distribution on the medium during filtration. Backwash processes may comprise multiple steps. For example, a three step backwash may be utilized to provide medium cleaning in the most efficient manner. A phase between backwash and filtration sequences was analysed to promote adequate control improved filtration duration. Likewise, additional control was established to minimize pressure build up in the filter and ultimately enhance filtration duration.

A commercial pilot study took place at a municipal wastewater treatment facility for five (5) months and continuously produced an effluent quality average below 1.0 mg/L for TSS and 0.9 NTU (turbidity) for all filtration rates tested as shown in Table 1:

TABLE 1

Compressible Medium Filter Removals Performances

| Filtration Rate gpm/ft$^2$ - m$^3$/h/m$^2$ | Water Recovery % | Water Loss % | Eff. TSS mg/L | Eff. Tur. NTU | TSS Removal % | Tur. Removal % | Count day |
|---|---|---|---|---|---|---|---|
| 30-73.3 | 98 | 2 | 0.7 | 0.7 | 87 | 77 | 16 |
| 35-85.6 | 97 | 3 | 0.9 | 0.8 | 76 | 68 | 20 |
| 40-97.8 | 97 | 3 | 1.4 | 1.1 | 76 | 61 | 12 |
| Average | 97 | 2.7 | 1.0 | 0.9 | 80 | 69 | |

Backwash

Backwash—Triggering.

In general, the synthetic compressible media filter design may backwash based upon one or more triggers, which may comprise but are not limited to specified pressure, time, and/or turbidity. With regard to pressure, for example, the synthetic compressible media filter design may comprise a pressure set point (in inches of H$_2$O) that may be adjusted by the operator based on the specifics of the filter. Specifics of the filter that may dictate, affect, or impact backwash cycles based on pressure may include, but are not limited to, (i) filter geometry (filter elevation); (ii) medium thickness (inches) of the filter; (iii) solid loading (kg/ft$^2$/hour); and/or hydraulic loading (gpm/ft$^2$). An exemplary set point, in accordance with some embodiments of the present invention, may be 68 inches of H$_2$O.

With regard to time, the synthetic compressible media filter design may comprise a timer set point when backwash may be triggered—for example, regardless of pressure in the filter or turbidity concentration in the effluent. For example, a timer set point may be set at 48 hours.

With regard to turbidity, the synthetic compressible media filter design may further comprise an effluent turbidimeter that may monitor the turbidity (for example, by providing continuous monitoring). A set point (in nephelometric turbidity unis (NTU)) may trigger a backwash cycle, in order to prevent turbidity breakthrough. For example, in accordance with some embodiments of the invention, a value of 6 NTU may be used to trigger backwash.

Backwash—Sequences.

In accordance with some embodiments of the present invention, the synthetic compressible media filter design may utilize a backwash cycle or process that may comprise three (3) sequences: (i) air and water wash; (ii) air purge; and/or (iii) medium compression.

The air and water wash sequence may start after the pressure activated backwash set point is reached. Note that if the backwash is triggered by either the time or turbidity set points, the air and water wash sequence may be delayed until the pressure in the filter reaches the pressure activated backwash set point. This may be accomplished, for example, by closing a filter effluent valve while maintaining influent into the filter. Once the pressure in the synthetic compressible media filter reaches the pressure set point, the influent flow may be stopped, and then the air and water wash sequence may be begin. In general, the air and water wash sequence may comprise two steps of (i) breaking the medium; and (ii) washing the medium.

In general, breaking the medium may refer to breaking the media free from the compressed stage. At the end of the filtration sequence, the media and solids may be compressed together against the filter wall and plenum. Water and air flow may be used to generate the forces necessary to break the media free from this compressed stage. The water and airflow—as well as duration of each—may be adjusted by the filter operator (for example, based on medium thickness). For example, a water flow of 10 gpm/ft$^2$ and 15 scfm for three (3) minutes may be utilized.

Washing the medium may be accomplished to release entrapped solids from the media fibers. The density of the synthetic media may be higher than the density of water (even slightly so), and accordingly both water and air may be combined to create motion patterns to enhance media collisions. Air bubbles may carry the media to a screen at the top of the filter. As the bubble escapes through the screen, the media may be retained, which may then sink back towards the plenum and collide with other rising media. When the descending media strikes the ascending media, an efficient release of the entrapped solids may occur. In accordance with some embodiments of the present invention, typical backwash flowrates may be 10 gpm/ft$^2$ for water and 10 scfm/ft$^2$ for air. As before, air and water flow rates may be adjustable by a filter operator based at least in part on filtration flow rates and solids loading.

The second sequence of backwashing may include an air purge. In general it may be important to expel air from the filter before compressing the medium for filtering use. This may be desirable since, as a down-flow filter, remaining air may not be able to escape and may become trapped in the media. Air that may accumulate in the filter medium may form pressurized pockets that cannot be penetrated by the water, thereby potentially causing a reduction in effective medium volume used to entrap solids. This may in turn cause premature backwash. In general, air may be purged from the synthetic compressible media filter design by creating an upward water flow. For example, in accordance with some embodiments of the present invention, such upward water flow may be at five (5) to ten (10) gpm/ft$^2$ for two (2) to five (5) minutes. Again, the water flow rate and/or duration may be based at least in part on the medium thickness.

The third sequence of backwashing may comprise medium compression. Medium compression may be achieved by, for example, creating a transition between the backwash and filtration. At the end of the backwash air-purge sequence, the water level may be at its maximum, at which point an effluent control valve may be opened for a predefined duration (time delay set point), thereby causing the water to drain out of the filter. During draining, both water and media velocities may increase. However, during filter drainage higher friction forces between the media and the filter wall compared to the water head loss in the filter may cause the water velocity to exceed the media velocity. Therefore, the water level may drop exposing the media to air. In order to avoid this exposure, the filter influent flow may be started, using a time delay set point when the water level is still above the media level.

In accordance with some embodiments of the present invention, medium compression may be achieved by variable water flow and/or constant water flow. Utilizing variable water flow, the influent flow rate may be increased for a first period of time (for example, for a minute or two) in order to obtain a faster media compression and eliminate or reduce the need for water to waste sequence. However, depending on the medium thickness and/or filter elevation, it may be necessary or desirable to create water to waste sequences in order to minimize turbidity release in the filter effluent. In such circumstances, the water to waste sequence duration may be defined based at least in part on filter turbidity observation.

The sequence control of backwashing the synthetic compressible media filter may be performed, at least in part, by a programmable logic control (PLC). In accordance with some embodiments of the present invention, an effluent flow control valve may be used to maintain an effluent flow rate equal (or substantially equal) to an influent flow rate. After backwash, the effluent valve may be partially opened to create head as necessary to equalize (or substantially equalize) effluent flow to influence flow. As the solids may accumulate in the medium, the solids may cause additional head loss, which in turn may cause the effluent flow rate to decrease. The PLC may register this decrease in flow rate, and may open the effluent valve to balance out the head loss across the filter medium. In general, this may result in maintaining the effluent flow rate the same or similar to the influent flow rate—as well as maintaining the water level above the medium.

During pilot studies, backwash requirements were identified at 10 gpm/ft$^2$ or 24.4 m$^3$/h/m$^2$ for water flow rate and 10 Scfm or 17 Nm$^3$/h for the air while overall duration varied between 23 to 28 minutes based on applied solids and hydraulic loads as shown in Table 2.

TABLE 2

Compressible Medium Filter Backwash Requirements

| Filtration Rate gpm/ft$^2$- m$^3$/h/m$^2$ | Frequency h | Duration minute | Water Flow gpm/ft$^2$- m$^3$/h/m$^2$ | Air Flow Scfm-Nm$^3$/h | Ave. Pressure Increase PSI/h- kPa/h |
|---|---|---|---|---|---|
| 30-73.3 | 7.5 | 28 | 10-24.4 | 10-17 | 0.33-2.24 |
| 35-85.6 | 4.4 | 27 | 10-24.4 | 9-15 | 0.56-3.83 |
| 40-97.8 | 3.3 | 23 | 10-24.4 | 10-17 | 0.74-5.08 |

TSS and turbidity in the effluent were continuously below Title 22 requirements, making the new SCMF an excellent process for reuse and tertiary treatment from municipal WWTPs. The commercial pilot study provided all relevant process parameters and necessary geometry considerations to design a full size plant.

In accordance with aspects of some embodiments of the present invention, the new synthetic compressible media filter design is capable of an extreme filtration rate up to 40 gpm/ft$^2$ or 97.8 m$^3$/h/m$^2$ while producing effluent with TSS<5 mg/L, and turbidity<2 NTU, thereby satisfying current Title 22 discharge requirements.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A method of providing backwash to a synthetic compressible medium filter system comprising a filter including compressible filter medium disposed within a fixed vessel, at least one backwash pump, and at least one air scour blower, the method comprising at least three sequences of:
   air and water wash;
   air purge, comprising removing substantially all of the air entrapped in the medium by providing an upward flow of water from the backwash pump to the medium; and
   medium compression, the medium compression resulting from the introduction of raw water to the filter with enough energy to compress the medium;
   wherein the compressible medium filter system does not require or use additional compression mechanisms, but relies upon the fluid flow to provide compression.

2. The method of claim 1, wherein the backwash is triggered by one or more of a pressure set point, time set point (2 hours to 24 hours), and/or turbidity set point.

3. The method of claim 2, wherein the pressure set point is adjustable based upon factors including filter geometry, medium thickness, solid loading, and/or hydraulic loading, and comprises a set point between 36 to 200 inches of H$_2$O.

4. The method of claim 2, wherein the time set point is between two (2) to twenty-four (24) hours.

5. The method of claim 2, wherein the turbidity set point is between five (5) and fifteen (15) Nephelometric Turbidity Units (NTU).

6. The method of claim 2, wherein the turbidity set point is less than six (6) Nephelometric Turbidity Units (NTU).

7. The method of claim 2, wherein the air and water wash sequence is initiated when the pressure set point is reached.

8. The method of claim 1, wherein the air and water wash sequence comprises breaking the medium and washing the medium.

9. The method of claim 8, wherein:
   breaking the medium comprises using water and air flow to generate forces to break the medium free from a compressed stage;
   washing the medium comprises combining water received in the filter medium from the backwash pump and air from the air scour blower to create motion patterns to cause collision of the filter media.

10. The method of claim 9, wherein breaking the medium uses a water flow of 10 gpm/ft$^2$ and air flow of 15 scfm for a period of time.

11. The method of claim 10, wherein the period of time is between one (1) to five (5) minutes.

12. The method of claim 9, wherein washing the medium comprises:

using the backwash pump to provide backwash flow into the medium and the air scour blower to provide air into the medium, causing bubbles which carry at least some of the media to the top of the filter, at which point the air escapes from the filter and the media sinks downward, striking media ascending with air bubbles.

13. The method of claim 12, wherein the backwash pump provides a flow of approximately 10 gpm/ft$^2$ and the air scour blower provides air flow of approximately 10 scfm/ft$^2$.

14. The method of claim 1, wherein the upward water flow from the backwash pump to the medium in the air purge sequence is provided for a period of time at a rate of 5 to 10 gpm/ft$^2$.

15. The method of claim 14, wherein the period of time is between one (1) to ten (10) minutes.

16. The method of claim 1, wherein medium compression comprises a transition between backwash and filtration processes of the filter system, during which excess backwash water is drained from the filter and influent flow is provided above the usual rate in order to compress the media quickly and eliminate the need for a water to waste sequence.

17. The method of claim 16, further comprising introducing raw water into the filter, and wherein the backwash water and introduced raw water provide enough energy to compress the medium without introduction of air into the medium.

18. The method of claim 1, wherein medium compression comprises a transition between backwash and filtration processes of the filter system, during which a water to waste sequence is used to minimize turbidity release of the filter effluent.

19. The method of claim 18, wherein the water to waste sequence comprises sending backwash water directly to waste after flowing through the filter.

20. A method of providing backwash to a synthetic compressible medium filter system comprising a filter including compressible filter medium disposed within a fixed vessel wherein the compressible medium filter system does not require or use additional compression mechanisms but relies upon the fluid flow to provide compression, at least one backwash pump, and at least one air scour blower, the backwash being triggered by one or more of a pressure set point, time set point, and/or turbidity set point, the backwash method comprising at least three sequences of:
an air and water wash sequence, comprising breaking the medium and washing the medium;
an air purge sequence, comprising removing substantially all of the air entrapped in the medium by providing a flow of water from the backwash pump to the medium for a period of time; and
a medium compression sequence, compressing the medium to achieve desired filtration rates, while avoiding exposing the medium to air, the medium compression sequence comprising introducing raw water into the filter, where the backwash water and introduced raw water provide enough energy to compress the medium without introduction of air into the medium.

21. The method of claim 20, wherein:
breaking the medium comprises using water received from the backwash pump and air flow from the air scour blower to generate forces to break the medium free from a compressed stage;
washing the medium comprises combining water received in the filter medium from the backwash pump and air from the air scour blower to create motion patterns to cause collision of the filter media, wherein the air scour blower provides air into the medium, causing bubbles which carry at least some of the media to the top of the filter, at which point the air escapes from the filter and the media sinks downward, striking media ascending with air bubbles.

22. The method of claim 20, wherein medium compression comprises a transition between backwash and filtration processes of the filter system, during which excess backwash water is drained from the filter and influent flow is provided above the usual rate in order to compress the media quickly and eliminate the need for a water to waste sequence.

23. The method of claim 20, wherein medium compression comprises a transition between backwash and filtration processes of the filter system, during which a water to waste sequence is used to minimize turbidity release of the filter effluent.

24. A method of providing backwash to a synthetic compressible medium filter system comprising a filter including compressible filter medium disposed in a fixed vessel wherein the compressible medium filter system does not require or use additional compression mechanisms but relies upon the fluid flow to provide compression, at least one backwash pump, and at least one air scour blower, the backwash being triggered by one or more of a pressure set point, time set point, and/or turbidity set point, the backwash method comprising at least three sequences of:
an air and water wash sequence, comprising breaking the medium and washing the medium, wherein:
breaking the medium comprises using water received from the backwash pump and air flow from the air scour blower to generate forces to break the medium free from a compressed stage; and
washing the medium comprises combining water received in the filter medium from the backwash pump and air from the air scour blower to create motion patterns to cause collision of the filter media, wherein the air scour blower provides air into the medium, causing bubbles which carry at least some of the media to the top of the filter, at which point the air escapes from the filter and the media sinks downward, striking media ascending with air bubbles;
an air purge sequence, comprising removing substantially all of the air entrapped in the medium by providing a flow of water from the backwash pump to the medium for a period of time; and
a medium compression sequence which provides a transition between backwash and filtration processes of the filter system, during which the medium is compressed to achieve desired filtration rates, while avoiding exposing the medium to air, the medium compression sequence comprising introducing raw water into the filter, where the backwash water and introduced raw water provide enough energy to compress the medium without introduction of air into the medium.

25. A system for providing backwash to a synthetic compressible media filter system comprising:
A compressible filter medium disposed in a fixed vessel;
One or more backwash pumps;
One or more air scour blowers; and
A programmable logic controller programmed to perform a backwash protocol comprising:
An air and water wash sequence;
An air purge sequence, comprising removing substantially all of the air entrapped in the medium by providing an upward flow of water from the backwash pump to the medium; and A medium compression sequence, the medium compression resulting from the introduction of raw water to the filter with enough energy to compress the medium and does not require or use additional compression mechanisms.

26. The system of claim 25, wherein:

the air and water wash sequence comprises breaking the medium and washing the medium;

the medium compression sequence comprises compressing the medium to achieve desired filtration rates, while avoiding exposing the medium to air, the medium compression sequence comprising introducing raw water into the filter, wherein the backwash water and introduced raw water provide enough energy to compress the medium without introduction of air into the medium.

27. A The system of claim 26, wherein:

Breaking the medium comprises using water received from the backwash pump and air flow from the air scour blower to generate forces to break the medium free from a compressed stage;

Washing the medium comprises combining water received in the filter medium from the backwash pump and air from the air scour blower to create motion patterns to cause collision of the filter media, wherein the air scour blower provides air into the medium, causing bubbles which carry at least some of the media to the top of the filter, at which point the air escapes from the filter and the media sinks downward, striking media ascending with air bubbles; and The medium compression sequence provides a transition between backwash and filtration processes of the filter system.

* * * * *